US010509263B2

(12) United States Patent
Lee et al.

(10) Patent No.: US 10,509,263 B2
(45) Date of Patent: Dec. 17, 2019

(54) BACKLIGHT UNITS FOR DISPLAY DEVICES

(71) Applicant: Nanosys, Inc., Milpitas, CA (US)

(72) Inventors: Ernest Lee, Milpitas, CA (US); Robert E. Wilson, Milpitas, CA (US); Steven Gensler, Milpitas, CA (US)

(73) Assignee: Nanosys, Inc., Milpitas, CA (US)

( * ) Notice: Subject to any disclaimer, the term of this patent is extended or adjusted under 35 U.S.C. 154(b) by 233 days.

(21) Appl. No.: 15/478,566

(22) Filed: Apr. 4, 2017

(65) Prior Publication Data

US 2017/0269432 A1 Sep. 21, 2017

Related U.S. Application Data

(63) Continuation of application No. 15/061,115, filed on Mar. 4, 2016, now Pat. No. 9,658,489.
(Continued)

(51) Int. Cl.
*F21V 9/00* (2018.01)
*G02F 1/1335* (2006.01)

(52) U.S. Cl.
CPC .. *G02F 1/133609* (2013.01); *G02F 1/133602* (2013.01); *G02F 1/133603* (2013.01);
(Continued)

(58) Field of Classification Search
CPC ......... G02F 1/133609; G02F 1/133602; G02F 1/133603; G02F 2202/28; G02F 2001/133614; G02F 2202/36
See application file for complete search history.

(56) References Cited

U.S. PATENT DOCUMENTS 6,949,206 B2 9/2005 Whiteford et al.
7,267,875 B2 9/2007 Whiteford et al.
(Continued)

FOREIGN PATENT DOCUMENTS

CN 104932142 A 9/2015
JP 2010230816 10/2010

OTHER PUBLICATIONS

Alivisatos, A. P., "Semiconductor Clusters, Nanocrystals, and Quantum Dots," Science, vol. 271, No. 5251, Feb. 16, 1996; pp. 933-937.
(Continued)

*Primary Examiner* — Ali Alavi
(74) *Attorney, Agent, or Firm* — Sterne, Kessler, Goldstein & Fox P.L.L.C.

(57) ABSTRACT

Embodiments of a device and a method of forming the same are described. The device includes a backlight unit and an image generating unit. The backlight unit includes an optical cavity having a top side, a bottom side, and side walls. The backlight unit further includes an array of light sources coupled to the optical cavity and a quantum dot film positioned within the optical cavity. The quantum dot film is configured to process light received from the array of light sources and the backlight unit is configured to transit the processed light to the image generating unit. The method includes providing an optical cavity having a top side, a bottom side, and side walls. The method further includes coupling an array of light sources to the optical cavity and supporting a quantum dot film within the optical cavity.

20 Claims, 4 Drawing Sheets

Related U.S. Application Data

(60) Provisional application No. 62/273,763, filed on Dec. 31, 2015.

(52) U.S. Cl.
CPC ............ *G02F 2001/133614* (2013.01); *G02F 2202/28* (2013.01); *G02F 2202/36* (2013.01)

(56) References Cited

U.S. PATENT DOCUMENTS

| | | |
|---|---|---|
| 7,374,807 B2 | 5/2008 | Parce et al. |
| 7,572,393 B2 | 8/2009 | Whiteford et al. |
| 7,585,564 B2 | 9/2009 | Whiteford et al. |
| 7,645,397 B2 | 1/2010 | Parce et al. |
| 8,203,540 B2 | 6/2012 | Cernasov |
| 8,283,412 B2 | 10/2012 | Liu et al. |
| 8,563,133 B2 | 10/2013 | Whiteford et al. |
| 9,199,842 B2 | 12/2015 | Dubrow et al. |
| 9,658,489 B1 | 5/2017 | Lee et al. |
| 2004/0047042 A1 | 3/2004 | Takahashi et al. |
| 2008/0237540 A1 | 10/2008 | Dubrow |
| 2010/0110728 A1 | 5/2010 | Dubrow et al. |
| 2012/0113672 A1 | 5/2012 | Dubrow et al. |
| 2015/0098212 A1* | 4/2015 | Won ................... G02F 1/133615 362/97.3 |
| 2015/0124195 A1 | 5/2015 | Chen et al. |
| 2015/0300576 A1* | 10/2015 | Matsuura .......... G02F 1/133603 362/97.1 |
| 2015/0339996 A1* | 11/2015 | Schuck ............. G02F 1/133603 348/58 |
| 2016/0070137 A1 | 3/2016 | You et al. |
| 2016/0204317 A1 | 7/2016 | Li et al. |

OTHER PUBLICATIONS

International Search Report and Written Opinion directed to related International Application No. PCT/US2016/068022, dated Mar. 21, 2017; 20 pages.

Murray et al., "Synthesis and Characterization of Nearly Monodisperse CdE (E=S, Se, Te) Semiconductor Nanocrystallites," Journal of the American Chemical Society, vol. 115, No. 19, 1993; pp. 8706-8715.

Peng et al., "Epitaxial Growth of Highly Luminescent CdSe/CdS Core/Shell Nanocrystals with Photostability and Electronic Accessibility," Journal of the American Chemical Society, vol. 119, No. 30, 1997; pp. 7019-7029.

U.S. Appl. No. 10/796,832, Scher et al., "Process for producing nanocrystals and nanocrystals produced thereby," filed Mar. 10, 2004.

* cited by examiner

BACKLIGHT UNITS FOR DISPLAY DEVICES

CROSS REFERENCE TO RELATED APPLICATIONS

The present application is a continuation of U.S. patent application Ser. No. 15/061,115, filed Mar. 4, 2016, which claims the benefit of U.S. Provisional Patent Application No. 62/273,763, filed Dec. 31, 2015, each of which are hereby incorporated by reference in their entirety.

BACKGROUND OF THE INVENTION

Field

The present invention relates to display devices including light-emitting diode (LED) based backlight units (BLUs) and phosphor films including luminescent nanocrystals such as quantum dots (QDs).

Background

Display devices (e.g., liquid crystal displays (LCDs)) are used as screens or displays for a wide variety of electronic devices and typically require some form of backlighting for images to be visible in normal or reduced ambient light environments. In a BLU of the display device, LEDs are typically utilized as a light source. The LEDs may be arranged in a two dimensional array behind the viewing area of the display device or around the edge or perimeter of the display device. The BLU may also utilize phosphors, such as yttrium-aluminum-garnet (YAG) phosphors.

Luminescent nanocrystals represent a new, alternative class of phosphors often used in configurations where the phosphor may be placed external to the LEDs. Light emanating from the LEDs may be processed through a phosphor film of the display device to produce white light, which may be distributed across a display screen of the display device.

For example, luminescent nanocrystals may be embedded in a flexible film/sheet (e.g., quantum dot enhancement film (QDEF®) supplied commercially from 3M Company, St. Paul, Minn. using quantum dots supplied by Nanosys, Inc, Milpitas, Calif.) that may be placed in the display device (see, e.g., U.S. Patent Publication Nos. 2010/0110728 and 2012/0113672, which are incorporated by reference herein in their entirety). QDEF is a registered trademark of Nanosys, Inc. In other examples, luminescent nanocrystals may be encapsulated in a container, for example a capillary (see, e.g., U.S. Patent Publication No. 2010/0110728).

In current display devices using QDEFs, the white point values of the light distributed across display screens depend on the QD population size in the QDEFs. The QD population size can be adjusted by changing the concentration of QDs in the QDEF and/or changing the thickness of the QDEF. Furthermore, reducing the QD population size in order to achieve a given white point can reduce the cost of display devices using QDEF. However, maximum thickness of QDEFs may be limited by the thickness of display devices and maximum QD concentration may be limited by current technology. These limitations can present challenges in achieving the white point values specified by manufacturers and/or reducing the cost of display devices.

SUMMARY

Disclosed herein are embodiments that overcome the above mentioned limitations of display devices.

According to an embodiment, a display device includes a BLU and an image generating unit (IGU). The BLU includes an optical cavity having a top side, a bottom side, and side walls. The BLU further includes an array of light sources (e.g., LEDs) coupled to the optical cavity and a QD film positioned within the optical cavity. The QD film is configured to process light received from the array of light sources and the BLU is configured to transit the processed light to the image generating unit.

According to an embodiment, the QD film is coupled to a bottom surface of the top side.

According to an embodiment, the BLU further includes a first plate configured to be optically transmissive and to support the QD film within the optical cavity.

According to an embodiment, the BLU further includes support posts configured to support the first plate.

According to an embodiment, the BLU further includes a first plate and a second plate. The QD film is interposed between the first and second plates. The first plate is configured to support the QD film.

According to an embodiment, the second plate includes an optically diffusive material.

According to an embodiment, the second plate includes an optically transparent material and an optically translucent material.

According to an embodiment, the second plate includes an optically translucent material and pores having different sizes in diameter.

According to an embodiment, the QD film includes an array of QD films.

According to an embodiment, each QD film of the array of QD films is configured to cover a corresponding row of the array of light sources.

According to an embodiment, the QD film includes an array of QD films. Each QD film of the array of QD films is coupled to a top surface of the bottom side and is configured to enclose a corresponding row of the array of light sources.

According to an embodiment, the each QD film is configured to form a volume surrounding the corresponding row of the array of light sources.

According to an embodiment, the volume includes a cross-sectional shape of an arch, a semi-circle, a rectangle, a trapezoid, a triangle, or a combination thereof.

According to an embodiment, the top side of the optical cavity includes an optically diffusive material.

According to an embodiment, the top side of the optical cavity includes an optically transparent material and an optically translucent material.

According to an embodiment, the top side of the optical cavity includes an optically translucent material and pores having different sizes in diameter, According to an embodiment, the QD film includes a plurality of quantum dots configured to emit red light.

According to an embodiment, the QD film includes a plurality of quantum dots configured to emit green light.

According to an embodiment, the QD film includes a first plurality of QDs configured to emit red light and a second plurality of QDs configured to emit green light.

According to an embodiment, the array of light sources is coupled to a top surface of the bottom side of the optical cavity.

According to an embodiment, the array of light sources includes an array of emitting diodes (LEDs).

According to an embodiment, the BLU further includes an optical processing unit having a brightness enhancing film and a polarizing film coupled to the brightness enhancing film.

According to an embodiment, the IGU includes a liquid crystal module and a touch screen display coupled to the liquid crystal module.

According to an embodiment, the display device includes at least one of a liquid crystal display device, a computer, a tablet, a hand-held device, a phone, a wearable device, and a TV.

According to an embodiment, a light source unit includes an optical cavity having a top side, a bottom side, and side walls. The light source unit further includes an array of light sources coupled to a top surface of the bottom side and a QD film positioned between the top side and the array of light sources. The QD film is configured to process light received from the array of light sources.

According to an embodiment, the light source unit further includes a first plate and a second plate. The QD film is interposed between the first and second plates. The first plate is configured to support the QD film.

According to an embodiment, the QD film includes an array of QD films.

According to an embodiment, each QD film of the array of QD films is configured to cover a corresponding row of the array of light sources.

According to an embodiment, the QD film includes an array of QD films. Each QD film of the array of QD films is coupled to a top surface of the bottom side and is configured to enclose a corresponding row of the array of light sources.

According to an embodiment, the each QD film is configured to form a volume surrounding the corresponding row of the array of light sources.

According to an embodiment, the volume includes a cross-sectional shape of an arch, a semi-circle, a rectangle, a trapezoid, a triangle, or a combination thereof.

According to an embodiment, a method of forming a display device includes providing an optical cavity having a top side, a bottom side, and side walls. The method further includes coupling an array of light sources to the optical cavity and supporting a QD film within the optical cavity.

According to an embodiment, the method further includes providing an optically diffusive layer as the top side of the optical cavity.

According to an embodiment, the supporting of the QD film includes coupling the QD film to the top side of the optical cavity.

According to an embodiment, the supporting of the QD film includes providing a first plate positioned within the optical cavity and coupling the QD film to the first plate.

According to an embodiment, the supporting of the QD film includes providing a first plate and a second plate positioned within the optical cavity and interposing the QD film between the first and second plates.

According to an embodiment, the method further includes providing an optically diffusive layer as the second plate.

According to an embodiment, the method includes coupling the array of light sources to a top surface of the bottom side of the optical cavity.

According to an embodiment, the method further includes providing an array of QD films as the QD film.

According to an embodiment, the method further includes providing an array of QD films as the QD film and forming an enclosed volume surrounding a corresponding row of the array of light sources using each QD film of the array of QD films.

According to an embodiment, the forming of the enclosed volume includes bending the each QD film over the corresponding row of the array of light sources and coupling the each QD film to a top surface of the bottom side of the optical cavity.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
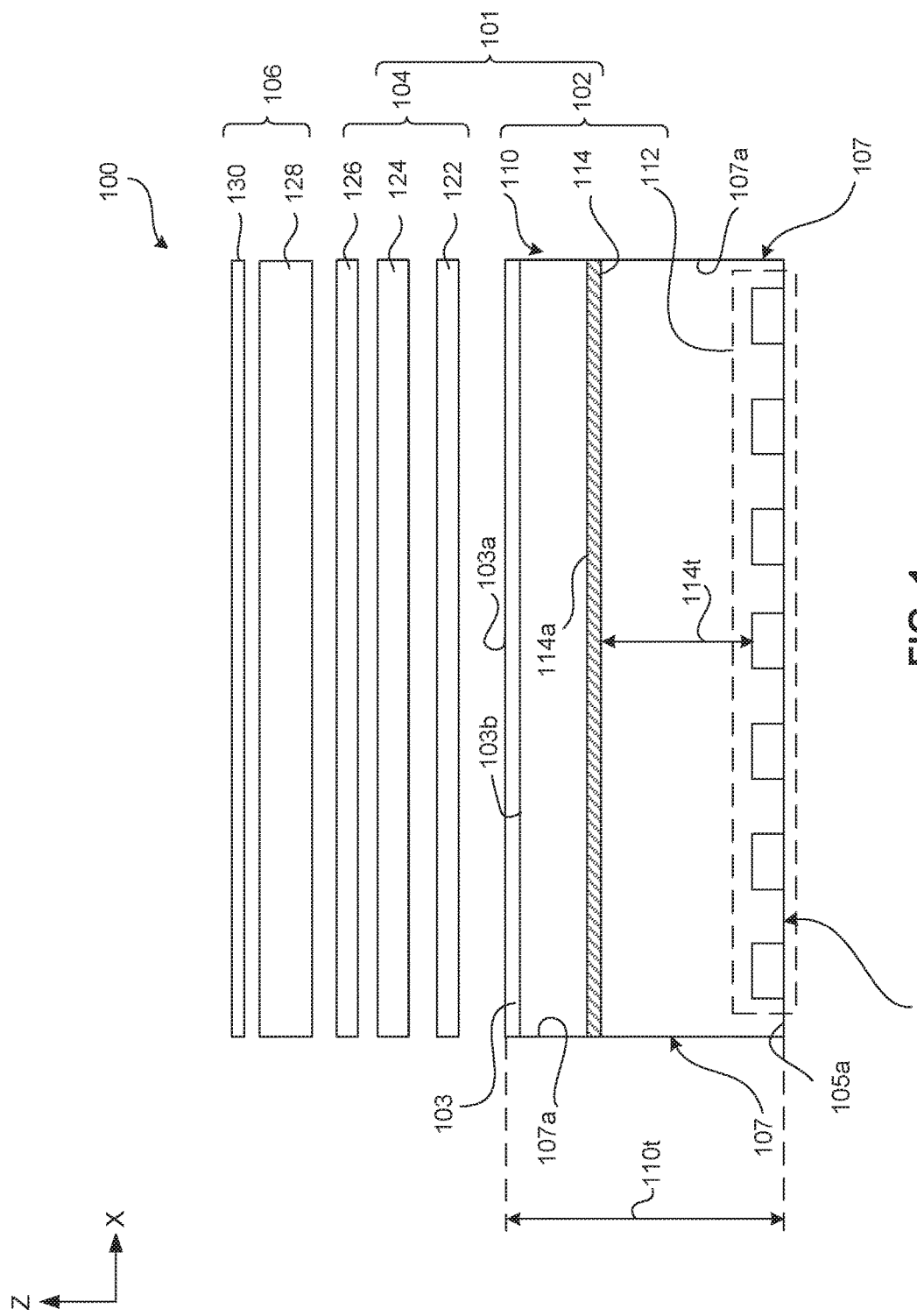
FIG. 1 illustrates a schematic of an exploded cross-sectional view a display device, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. Unless otherwise indicated, the drawings provided throughout the disclosure should not be interpreted as to-scale drawings.

DETAILED DESCRIPTION OF THE INVENTION

Although specific configurations and arrangements may be discussed, it should be understood that this is done for illustrative purposes only. A person skilled in the pertinent art will recognize that other configurations and arrangements can be used without departing from the spirit, and scope of the present invention. It will be apparent to a person skilled in the pertinent art that this invention can also be employed in a variety of other applications beyond those specifically mentioned herein. It should be appreciated that the particular implementations shown and described herein are examples and are not intended to otherwise limit the scope of the application in any way.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

All numbers in this description indicating amounts, ratios of materials, physical properties of materials, and/or use are to be understood as modified by the word "about," except as otherwise explicitly indicated.

In embodiments, the term "display device" refers to an arrangement of elements that allow for the visible representation of data on a display screen. Suitable display screens may include various flat, curved or otherwise-shaped screens, films, sheets or other structures for displaying information visually to a user. Display devices described herein may be included in, for example, display systems encompassing a liquid crystal display (LCD), televisions, computers, mobile phones, smart phones, personal digital assistants (PDAs), gaming devices, electronic reading devices, digital cameras, tablets, wearable devices, car navigation systems, and the like.

The term "about" as used herein includes the recited number ±10%. Thus, "about, ten" means 9 to 11, for example.

In embodiments, the term "optically coupled" means that components are positioned such that light is able to pass from one component to another component without substantial interference.

In embodiments, the terms "luminance" and "brightness" are used interchangeably and refer to a photometric measure of a luminous intensity per unit area of a light source or an illuminated surface.

In embodiments. the terms "specular reflectors," "specularly reflective surfaces," and "reflective surfaces" are used herein to refer to elements, materials, and/or surfaces capable of specular reflection.

In embodiments, the term "specular reflection" is used herein to refer to a mirror-like reflection of light (or of other kinds of wave) from a surface, when an incident light hits the surface.

In embodiments, the term "white point value" refers to the color white in terms of a set of chromaticity coordinates, for example, u' and v' coordinates in CIE 1976 color space, where CIE stands for Commission Internationale de l'Eclairage (International Commission on Illumination).

In embodiments. the term "unprocessed light" refers to any light that has not been processed through a phosphor film.

In embodiments, the term "processed light" refers to any light that has passed through a phosphor film at least once.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

Technical and scientific terms used herein have the meaning commonly understood by one of skill in the art to which the present application pertains, unless otherwise defined. Reference is made herein to various methodologies and materials known to those of skill in the art.

Example Embodiment a of Display Device

FIG. 1 illustrates a schematic of an exploded cross-sectional view of a display device 100, according to an embodiment. Display device 100 may comprise a BLU 101 including a light source unit (LSU) 102. BLU 101 may further optionally include an optical processing unit ((SPU) 104. Display device 100 may further include an image generating unit (IGU) 106.

LSU 102 may include an optical cavity 110, an array of LEDs 112 (e.g., white LEDs or blue LEDs) coupled to optical cavity 110, and a phosphor film 114. Optical cavity 110 may include a top side 103, a bottom side 105, and sidewalls 107 and a closed volume confined by top side 103, bottom side 105, and sidewalls 107. Array of LEDs 112 may be coupled to a top surface 105a of bottom side 105 within the closed volume. Array of LEDs 112 may be configured to provide a primary light (e.g., a blue light or a white light) that may be processed through OPU 104 and subsequently, transmitted to IGU 106 to be distributed across a display screen 130 of IOU 106. In some embodiments, array of LEDs 112 may be blue LEDs that emit in the range from about 440 nm to about 470 nm. In some embodiments, array of LEDs 112 may be white LEDs that emit in the range from about 440 nm to about 700 nm or other possible light wavelength ranges. In an embodiment, array of LEDs 112 may be a two-dimensional array of LEDs that are spread across an area of top surface 105a and the area may be equal to the surface area of display screen 130.

It should be noted that even though two sidewalls 107 are shown in FIG. 1, a person skilled in the art would understand that optical cavity 110 may include any number of sidewalls 107, according to various embodiments. For example, optical cavity 110 may have a cuboid shape and may include four sidewalls similar to sidewalls 107. Optical cavity 110 is not restricted to being cuboid in shape or having other straight-sided shapes. Optical cavity 110 may be configured to be any type of geometric shape, such as but not limited to cylindrical, trapezoidal, spherical, or elliptical, according to various embodiments, without departing from the spirit and scope of the present invention. It should also be noted that the rectangular cross-sectional shape of optical cavity 110, as illustrated in FIG. 1, is for illustrative purposes, and is not limiting. Optical cavity 110 may have other cross-sectional shapes (e.g., trapezoid, oblong, rhomboid), according to various embodiments, without departing from the spirit and scope of the present invention.

Top side 103 of optical cavity 110 may be configured to be an optically diffusive and transmissive layer such that light from array of LEDs 112 after passing through phosphor film 114 may exit optical cavity 110 through top side 103. Light exiting optical cavity 110 may have a substantially uniform distribution of brightness across top surface 103a of top side 103 and may traverse through OPU 104 and/or IGU 106. In an embodiment, top side 103 may include optically transparent areas and optically translucent areas that are strategically arranged to provide the substantially uniform distribution in light brightness exiting top side 103. In another embodiment, top side 103 may include pores of varying sizes in diameters and optically translucent areas that are strategically arranged to provide the substantially uniform distribution in light brightness exiting top side 103. Top side 103 may include materials such as, but not limited to, plastic, glass, and/or coated glass.

Bottom side 105 and/or sidewalls 107 of optical cavity 110 may be constructed from one or more materials (e.g., metals, non-metals, and/or alloys) that are configured to have scattering, specularly reflective, or a combination thereof top surface 105a and/or specularly reflective side wall interior surfaces 107a, respectively. In some embodiments, top surface 105a and/or side wall interior surfaces 107a may be white surfaces having scattering properties, mirror-like surfaces having mirror-like reflection properties, or a combination thereof. In some embodiments, top surface 105a and/or side wall interior surfaces 107a may be completely specularly reflective or partially specularly reflective and partially scattering. According to some embodiments, top side 103, bottom side 105, and/or sidewalls 107 may be detachable components of optical cavity 110 with respect to each other.

Phosphor film 114 may be a ODEF including luminescent nanocrystals. In an example embodiment, phosphor film 114 may include a plurality of phosphors (e.g., luminescent nanocrystals) that emit at the same wavelength, for example, at the wavelength corresponding to green light or red light in the visible spectrum. In another example embodiment, phosphor film 114 may include a first plurality of phosphors (e.g., luminescent nanocrystals) that emit at a first wavelength (e.g., wavelength corresponding to green light) and a second plurality of phosphors (e.g., luminescent nanocrystals) that emit at a second wavelength (e.g., wavelength corresponding to red light) that is different from the first wavelength.

Phosphor film 114 may be a down-converter, where at least a portion of the primary light from array of LEDs 112 may be absorbed, for example, by QDs in phosphor film 114 and re-emitted as secondary light having a lower energy or longer wavelength than the primary light. For example, the first plurality of phosphors and the second plurality of phosphors may absorb a portion of the blue light from array of LEDs 112 and be excited to emit green and red secondary lights, respectively. The unabsorbed portion of the blue primary light and the emitted green and red secondary lights may be mixed at a predetermined ratio to produce white light having a desired white point value. The white light may serve as a backlight of display device 100 after being emitted from optical cavity 110, transmitted through IGU 106, and distributed across display screen 130, according to an example embodiment.

Phosphor film 114 may be placed within the closed volume of optical cavity 110. In an embodiment, phosphor film 114 may be coupled to top side 103 using optically transparent adhesive, mechanical fasteners, or any other fastening mechanism such that top surface 114a of phosphor film 114 may be in substantial contact with bottom surface 103b of top side 103. In another embodiment, phosphor film 114 may be coupled to sidewalls 107 using optically transparent adhesive, mechanical fasteners, or any other fastening mechanism. The optically transparent adhesive may comprise tape, various glues, polymeric compositions such as silicones, etc., placed between phosphor film 114 and sidewalls 107 and/or bottom surface 103b. Additional optically transparent adhesive may include various polymers, including, but not limited to, poly(vinyl butyral), poly(vinyl acetate), epoxies, and urethanes; silicone and derivatives of silicone, including, but not limited to, polyphenylmethylsiloxane, polyphenylalkylsiloxane, polydiphenylsiloxane, polydialkylsiloxane, fluorinated silicones and vinyl and hydride substituted silicones; acrylic polymers and copolymers formed from monomers including, but not limited to, methylmethacrylate, butylmethacrylate, and laurylmethacrylate; styrene based polymers; and polymers that are cross linked with difunctional monomers, such as divinylbenzene, according to various examples.

The position of phosphor film 114 within optical cavity 110, for example, distance 114t between array of LEDs 112 and phosphor film 114 may depend on thickness 110t of optical cavity 110 and/or optical diffusivity of top side 103. In an example embodiment, distance 114t may range from about 20 mm to about 30 mm for a thickness 110t of optical cavity 110 ranging from about 30 mm to about 40 mm.

Placement of phosphor film 114 within optical cavity 110 may allow display device 100 to produce a white point value, of the light distributed across display screen 130, substantially similar to the white point value of current display devices by using a smaller QD population size in phosphor film 114 than the QD population size in phosphor films placed outside optical cavities in the current display devices. For example, display device 100 using about 40% smaller QD population size in phosphor film 114 than the QD population size in phosphor films placed outside optical cavities in the current display devices can produce substantially the same white point value as the current display devices.

In an example embodiment, a white point value of about (0.2199, 0.1908) was measured from a display device (e.g., display device 100) having a phosphor film (e.g., phosphor film 114) placed outside an optical cavity (e.g., optical cavity 110) of the display device. The white point value of the display device shifted to about (0.2728, 0.2609) when the phosphor film was shifted from outside to inside the optical cavity. Such increase in white point value coordinates towards a warmer white point value corresponds to about 50% increase in QD population size in phosphor films placed outside optical cavities in display devices. In other words, according to some embodiments, substantially similar white point values can be achieved with about 50% smaller QD population size in phosphor films if the phosphor films are placed inside optical cavities instead of outside the optical cavities as in current display devices.

The ability to reduce QD population size in phosphor films by placing them within optical cavities to obtain white point values that may be comparable to current, display devices increases the range of white point values that may be achieved in display devices (e.g., display device 100). Such reduction may also help to lower the cost of phosphor films in display devices.

Referring to FIG. 1, OPU 104 may be configured to further process the light received from LSU 102 to desired characteristics for transmission to IGU 106. OPU 104 may include, but not limited to, a brightness enhancing film (BEF) 122, a diffuser 124, and a reflective polarizing film (RPF) 126. It should be noted that OPU 104 may include more than one diffuser, BEF, and/or RPF without departing from the spirit and scope of the invention, as would be understood by a skilled person in the art. Orientations of these elements of OPU 104, their manufacture and incorporation in display devices are known in the art.

BEF 122 may include reflective and/or refractive films, reflective polarizer films, prism films, groove films, grooved prism films, prisms, pitches, grooves, or any suitable BEFs or brightness enhancement features known in the art. For example, BEF 122 may include conventional BEF such as Vikuiti™ or BEF available from 3M™. According to various embodiments, OPU 104 may include at least one BEF, at least two BEFs, or at least three BEFs. In example embodiments, at least one BEF comprises a reflective polarizer BEF, e.g., for recycling light which would otherwise be absorbed by RPF 126. The brightness-enhancing features and BEF 122 may include reflectors and/or refractors, polarizers, reflective polarizers, light extraction features, light recycling features, or any brightness-enhancing features known in the art. BEF 122 may include a first layer having pitches or prisms having a first pitch angle, according to an embodiment. Additionally or optionally, another BEF (not shown) in OPU 104 may include a second layer having pitches or prisms having a second pitch angle that is different from the first pitch angle.

The brightness-enhancing features of BEF 122 may be configured to reflect a portion of the processed light emitting from LSU 102 back toward phosphor film 114 inside optical cavity 110, thereby providing recycling of the light back into optical cavity 110. Light transmitted through BEF 122 may be dependent on the angle at which the light is incident upon BEF 122. For example, light traveling upward from optical cavity 110 may transmit through BEF 122 if the light is normal or perpendicular to BEF 122. However, such light may be reflected downward toward optical cavity 110 if the light has a higher angle. BEF 122 may be selected to have multiple reflection angles for light of different angles to achieve a desired recycling of the processed light from LSU 102.

Diffuser 124 is distinct from and supplemental to the scattering features described herein. According to an example of this embodiment, diffuser 124 may include any diffuser film known in the art, including gain diffuser films, and may be disposed above or below BEF 122 or other optical films of display device 100.

IGU 106 may include an LCD module 128 and display screen 130 and may be configured to generate images on display screen 130. Display screen 130 may be a touch screen display, according to an example embodiment.

Display device 100 may further comprise one or more medium materials (not shown) disposed between any of the adjacent elements in display device 100, for example between optical cavity 110 and BEF 122; between any different layers or regions within OPU 104; between phosphor film 114 and array of LEDs 112; and between any other elements of display device 100. The one or more medium materials may include any suitable materials, including, but not limited to, a vacuum, air, gas, optical materials, adhesives, optical adhesives, glass, polymers, solids, liquids, gels, cured materials, optical coupling materials, index-matching or index-mismatching materials, index-gradient materials, cladding or anti-cladding materials, spacers, epoxy, silica gel, silicones, any matrix materials described herein, brightness-enhancing materials, scattering or diffuser materials, reflective or anti-reflective materials, wavelength-selective materials, wavelength-selective anti-reflective materials, color filters, or other suitable medium material known in the art. Medium materials may also include optically transparent, non-yellowing, pressure-sensitive optical adhesives. Suitable materials include silicones, silicone gels, silica gel, epoxies (e.g., Loctite™ Epoxy E-30CL), acrylates (e.g., 3M™ Adhesive 2175), and matrix materials mentioned herein. The one or more medium materials may be applied as a curable gel or liquid and cured during or after deposition, or pre-formed and pre-cured prior to deposition. Curing methods may include UV curing, thermal curing, chemical curing, or other suitable curing methods known in the art. Index-matching medium materials may be chosen to minimize optical losses between elements of BLU 101.

It should be noted that display device 100 may include components other than those discussed herein. Display device 100 may be any type of geometric shape, such as but not limited to cylindrical, trapezoidal, spherical, or elliptical, according to various embodiments, without departing from the spirit and scope of the present invention. Display device 100 is not restricted to being cuboid in shape or having other straight-sided shapes. It should also be noted that the rectangular cross-sectional shape of display device 100, as illustrated in FIG. 1, is for illustrative purposes, and is not limiting. Display device 100 may have other cross-sectional shapes (e.g., trapezoid, oblong, rhomboid), according to various embodiments, without departing from the spirit and scope of the present invention. It should also be noted that even though optical cavity 110, BEF 122, diffuser 124, RPF 126, LCD module 128, and display screen 130 are shown in FIG. 1 to have similar dimensions along X direction, a person skilled in the art would understand that each of these components may have dimensions different from each other in one or more directions, according to various embodiments.

Example Embodiments of Light Source Units

Figure 2:
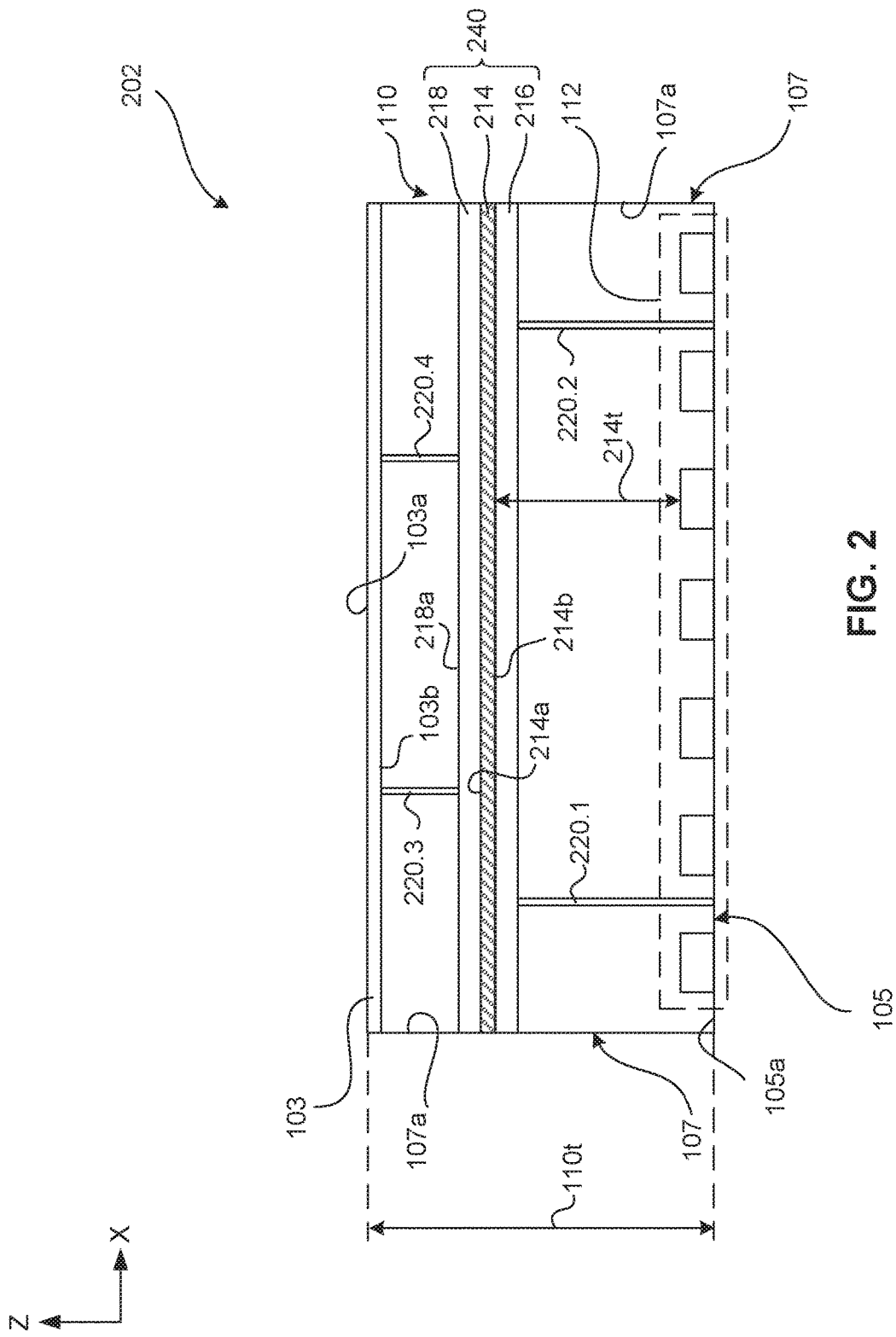
FIG. 2 illustrates a schematic of a cross-sectional view of a light source unit of a display device, according to another embodiment.

FIG. 2 illustrates a schematic of a cross-sectional view of an LSU 202, according to an embodiment. LSU 202 can be implemented as a part of display device 100, according to an example of this embodiment. LSU 202 may be similar to LSU 102 in structure and function except for the differences described below.

LSU 202 may include a first plate 216 configured to support phosphor film 214 within optical cavity 110. Phosphor film 214 may be similar to phosphor film 114 in structure, composition, and function. Bottom surface 214b of phosphor film 214 may be in substantial contact with first plate 216. In some embodiments, LSU 202 may further include support posts 220.1 and 220.2, mechanical fasteners, and/or any other fastening mechanism to hold first plate 216 in position within optical cavity 110. Alternatively, LSU 202 may include a second plate 218 positioned on top of phosphor film 214 and coupled to phosphor film 214 using optically transparent adhesive, mechanical fasteners, and/or any other fastening mechanism to hold phosphor film 214 in position within optical cavity. Top surface 214a of phosphor film 214 may be in substantial contact with second plate 218. Support posts 220.3 and 220.4, mechanical fasteners, and/or any other fastening mechanism may also be included in LSU 202 to hold second plate 218 in position within optical cavity 110. In some embodiments, support posts 220.1 through 220.4 may be partially or completely optically transparent. In some embodiments, support posts 220.1 through 220.4 may have scattering and/or specularly reflective surfaces. It should be noted that the rectangular cross-sectional shape of support posts 220.1 through 220.4, as illustrated in FIG. 1, is for illustrative purposes, and is not limiting. Support posts 220.1 through 220.4 may have other cross-sectional shapes (e.g., triangular, trapezoidal), according to various embodiments, without departing from the spirit and scope of the present invention.

In an alternate embodiment, LSU 202 may include both first and second plates 216 and 218 and phosphor film 214 may be interposed between first and second plates 216 and 218 to form an interposed structure 240. In an embodiment, top and bottom surfaces 214a and 214b may be in substantial contact, with second plate 218 and first plate 216, respectively. In another embodiment, bottom surface 214b may be in substantial contact with first plate 216 and a gap (not shown) may exist between top surface 214a and second plate 218. Interposed structure 240 may be held in position within optical cavity 110 using support posts 220.1 through 220.4, optically transparent adhesive, mechanical fasteners, and/or any other fastening mechanism.

It should be noted that even though four support posts 220.1 through 220.4 are shown in FIG. 2, a person skilled in the art would understand that optical cavity 110 may include any number of support posts, according to various embodiments.

First plate 216 may be configured to be optically transmissive such that light from array of LEDs 112 are transmitted to phosphor film 214. Additionally or optionally, first plate 216 may be configured to be optically diffusive such that substantially uniform distribution of light from array of LEDs 112 is received across substantially entire surface area 214b. Such uniform distribution of light may help to reduce peak light flux received by phosphor film 214 and maximize performance, integrity, and lifetime of phosphor film 214.

Second plate 218 may be configured to be optically transmissive and diffusive such that processed light from phosphor film 214 may pass through second plate 218 with a substantially uniform distribution of brightness across second plate top surface 218a. In some embodiments, second plate 218 may include optically transparent areas and optically translucent areas or pores of varying sizes in diameters and optically translucent areas that are strategically arranged to provide such optically diffusivity in second plate 218.

It should be noted that even though two plates 216 and 218 are shown in FIG. 2, a person skilled in the art would understand that optical cavity 110 may include any number of optically transmissive and/or optically diffusive plates between phosphor film 214 and array of LEDs 112 and between phosphor film 214 and top side 103, according to various embodiments.

The position of phosphor film 214 within optical cavity 110, for example, distance 214t between array of LEDs 112 and phosphor film 214 may depend on thickness 110t of optical cavity 110 and/or optical diffusivity of first plate 216, second plate 218, and/or top side 103. Placement of phosphor film 214 within optical cavity 110 may have benefits similar to the benefits discussed above with respect to the placement of phosphor film 114 within optical cavity 110.

Figure 3:
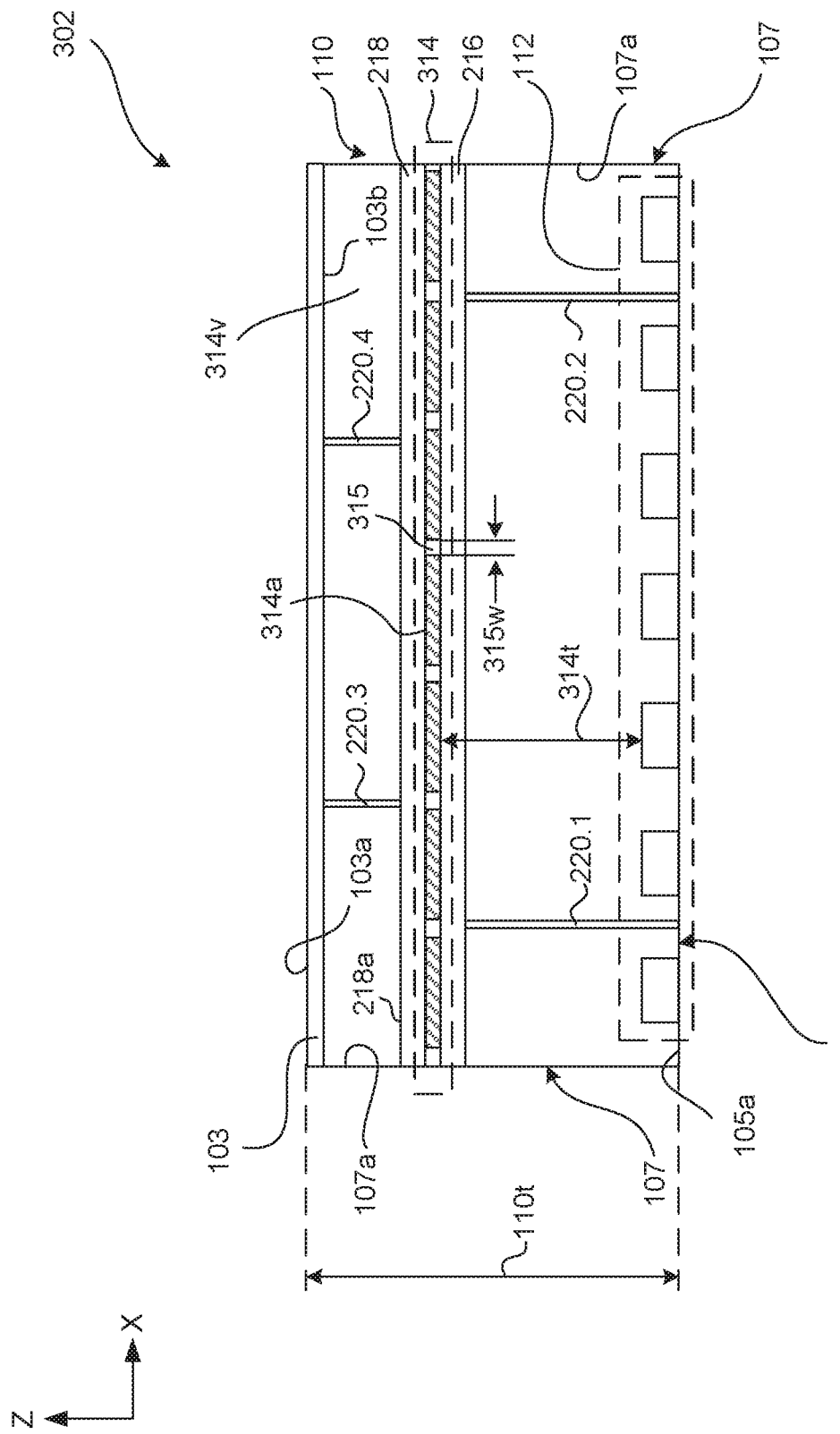
FIG. 3 illustrates a schematic of a cross-sectional view of a light source unit of a display device, according to another embodiment.

FIG. 3 illustrates a schematic of a cross-sectional view of an LSU 302, according to an embodiment. LSU 302 can be implemented as a part of display device 100, according to an embodiment, LSU 302 may be similar to LSUs 102 and 202 in structure and function except for the differences described below.

LSU 302 may include an array of phosphor films 314 placed within the closed volume of optical cavity 110. Each of the phosphor films 314 may be spaced from each other by a gap of 315 along X and/or Y direction. Each of the phosphor films 314 may be similar to phosphor films 114 and 214 in composition and function but may be smaller in dimension along, for example, X and/or Y direction compared to phosphor films 114 and 214. In an embodiment, each row of array of phosphor films 314 may be arranged to be substantially aligned with a corresponding row of array of LEDs 112. In another embodiment, each of the phosphor films 314 may have a dimension along Y direction large enough to cover the corresponding row of array of LEDs 112 along Y direction.

Using array of phosphor films 314, instead of a single phosphor film (e.g., phosphor films 114, 214), to cover an area equal to the surface area of a display screen (e.g., display screen 130), may help to reduce manufacturing costs of phosphor films, overcome phosphor film size limitations for large display screens, and/or improve production yield by producing substantially defect-free smaller phosphor films and consequently, improve yield of display devices.

Array of phosphor films 314 may be supported and held in position within optical cavity 110 using top side 103, first plate 216 and/or second plate 218 and support posts 220.1 through 220.4, optically transparent adhesive, mechanical fasteners, and/or any other fastening mechanism in a manner similar to phosphor films 114 and/or 214 as discussed above with reference to FIGS. 1 and 2, respectively.

Similar to phosphor films 114 and 214, the position of array of phosphor films 314 within optical cavity 110, for example, distance 3141 between array of LEDs 112 and array of phosphor films 314 may depend on thickness 110l1 of optical cavity 110 and/or optical diffusivity of first plate 216, second plate 218, and/or top side 103.

The position of array of phosphor films 314 within optical cavity 110 may also depend on width 315w of gap 315. In an embodiment, for a substantially small width 315w (e.g., width 315w less than 1 mm), array of phosphor film 314 may be coupled to top side 103 using optically transparent adhesive, mechanical fasteners, or any other fastening mechanism such that top surface 314a of each of the phosphor films 314 may be in substantial contact with bottom surface 103b. Larger the width 315w, farther away from top side 103 the array of phosphor films 314 may be placed within optical cavity 110, and larger a volume 314v between array of phosphor films 314 and top side 103 may be provided. Presence of gap 315 may cause light from LEDs to leak through gap 315 without being processed through array of phosphor films 314 and exit optical cavity 110. The unprocessed light may mix with the processed light exiting optical cavity 110 and consequently, adversely affect the white point uniformity of a display device (e.g., display device 100). To prevent such an adverse effect, according to an embodiment, volume 314v may be provided to allow the unprocessed light to spread out within volume 314v and lower the intensity of the unprocessed light before exiting optical cavity 110 to a value that may not adversely affect the white point uniformity of the display device. In an example, array of phosphor films 314 may be placed 10 mm below top side 103 for width 315w of about 3 mm. Placement of array of phosphor films 314 within optical cavity 110 may also have benefits similar to the benefits discussed above with respect to the placement of phosphor films 114 and 214.

Figure 4:
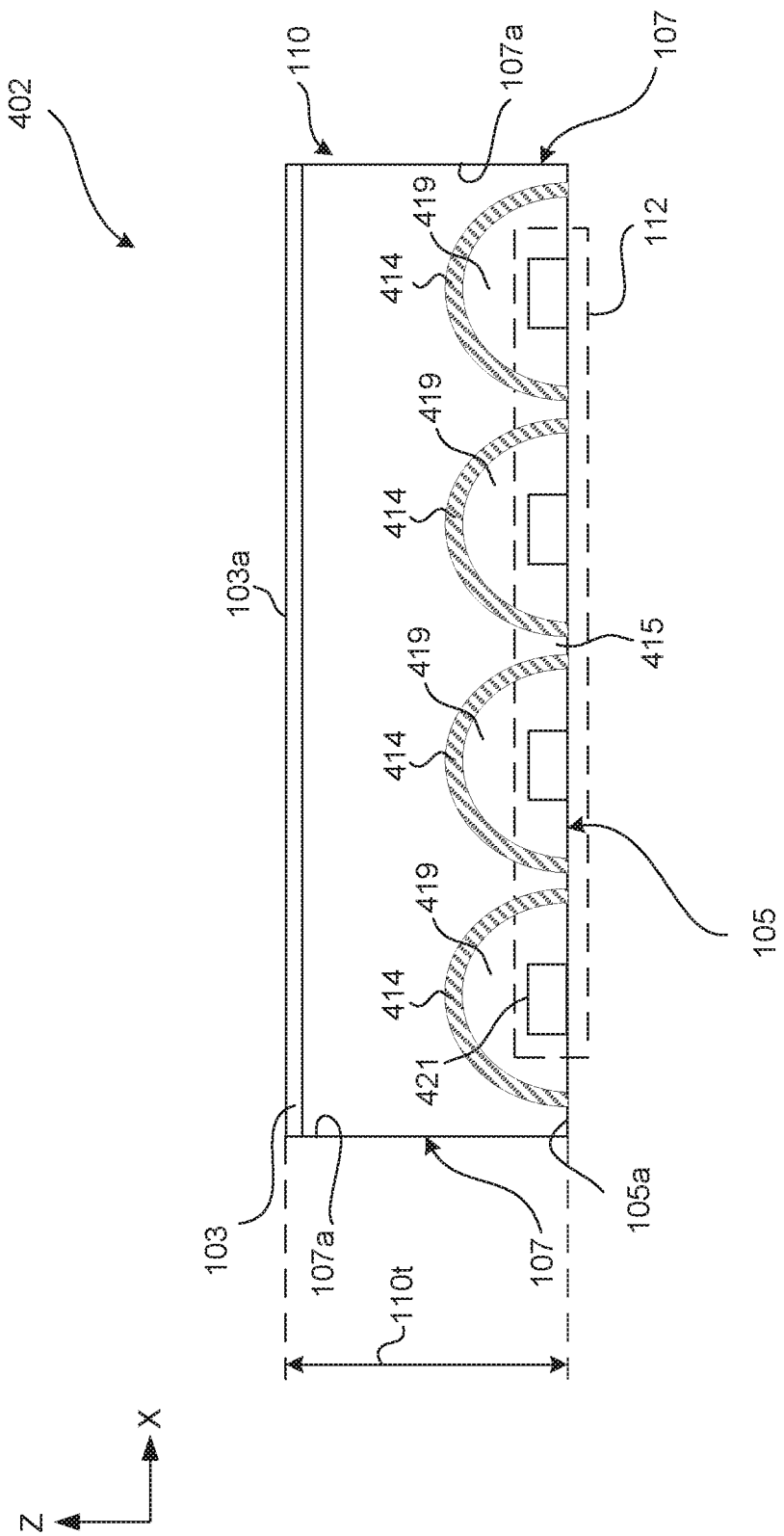
FIG. 4 illustrates a schematic of a cross-sectional view of a light source unit of a display device, according to another embodiment.

FIG. 4 illustrates a schematic of a cross-sectional view of an LSU 402, according to an embodiment. LSU 402 can be implemented as a part of display device 100, according to an embodiment. LSU 402 may be similar to LSUs 102, 202, and 302 in structure and function except for the differences described below.

LSU 402 may include an array of phosphor films 414 placed within the closed volume of optical cavity 110, Each of the phosphor films 414 may be similar to phosphor films 114, 214, and 314 in composition and function but may be smaller in dimension along, for example, X and/or Y direction compared to phosphor films 114 and 214. Using array of phosphor films 414 may have similar benefits as the above mentioned benefits of using array of phosphor films 314. Placement of array of phosphor films 414 within optical cavity 110 may also have benefits similar to the benefits discussed above with respect to the placement of phosphor films 114, 214, and 314.

Each of the phosphor films 414 may be bent and coupled to top surface 105a of bottom side 105 using optically transparent adhesive, mechanical fasteners, and/or any other fastening mechanism to form an array of volumes 419. Volumes 419 may have a cross-sectional shape of an arch, a semi-circle, a triangle, a rectangle, a trapezoid, or any other geometric shape. It should be noted that even though volumes 419 are shown to have similar cross-sectional shape, each of the volumes 419 may have different cross-sectional shapes from each other. Each of the volumes 419 may enclose a corresponding LED from array of LEDs 112 or a corresponding row of array of LEDs 112 along Y direction. In such arrangement of phosphor films 414, as discontinuity gaps 415 between array of phosphor films 414 are below emitting surfaces 421 of LEDs 112, leakage of unprocessed light through any discontinuity gaps between array of phosphor films such as discussed above with respect to array of phosphor films 314 may be minimized or substantially eliminated.

In some embodiments, shape and size of volumes 419 may be optimized to ensure substantially uniform distribution of light from LEDs 112 on phosphor films 414 and/or ensure intensity of light from LEDs 112 on phosphor films 414 is within tolerance for temperature and reliability. In some embodiments, emitting surfaces 421 may have lenses coupled to them. The lenses may have a cylindrical or elliptical symmetry along X and/or Y direction. In some embodiments, LSU 402 may have plates such as plates 216 and/or 218 placed between tops side 103 and array of phosphor films 414.

Example Embodiments of Luminescent Nanocrystal Phosphors

Described herein are various compositions comprising nanocrystals, including luminescent nanocrystals that may be included in phosphor films 114, 214, 314, and/or 414 (as described herein with reference to FIGS. 1-4). The various properties of the luminescent nanocrystals, including their absorption properties, emission properties and refractive index properties, may be tailored and adjusted for various applications. As used herein, the term "nanocrystal" refers to nanostructures that are substantially monocrystalline. A nanocrystal may have at least one region or characteristic dimension with a dimension of less than about 500 nm, and down to less than about 1 nm. The terms "nanocrystal," "nanodot," "dot," and "QD" are readily understood by the ordinarily skilled artisan to represent like structures and are used herein interchangeably. The present invention also encompasses the use of polycrystalline or amorphous nanocrystals. As used herein, the term "nanocrystal" also encompasses "luminescent nanocrystals." As used herein, the term "luminescent nanocrystals" may mean nanocrystals that emit light when excited by an external energy source.

The material properties of nanocrystals may be substantially homogenous, or in certain embodiments, may be heterogeneous. The optical properties of nanocrystals may be determined by their particle size, chemical or surface composition. The ability to tailor the luminescent nanocrystal size in the range between about 1 nm and about 15 nm may enable photoemission coverage in the entire visible spectrum to offer great versatility in color rendering. Particle encapsulation may offer robustness against chemical and UV deteriorating agents.

Nanocrystals, including luminescent nanocrystals, for use in embodiments described herein may be produced using any method known to those skilled in the art. Suitable methods and example nanocrystals are disclosed in U.S. Pat. No. 7,374,807; U.S. patent application Ser. No. 10/796,832, filed Mar. 10, 2004; U.S. Pat. No. 6,949,206; and U.S. Provisional Patent Application No. 60/578,236, filed Jun. 8, 2004, the disclosures of each of which are incorporated by reference herein in their entireties.

Luminescent nanocrystals for use in embodiments described herein may be produced from any suitable material, including an inorganic material, and more suitably an inorganic conductive or semiconductive material. Suitable semiconductor materials may include those disclosed in U.S. patent application Ser. No. 10/796,832, and may include any type of semiconductor, including group II-VI, group III-V, group IV-VI and group IV semiconductors. Suitable semiconductor materials may include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SuS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and an appropriate combination of two or more such semiconductors.

In certain embodiments, the nanocrystals may comprise a dopant from the group consisting of a p-type dopant or an n-type dopant. The nanocrystals useful herein may also comprise II-VI or III-V semiconductors. Examples of II-VI or III-V semiconductor nanocrystals may include any combination of an element from Group II, such as Zn, Cd and Hg, with any element from Group VI, such as S, Se, Te and Po, of the Periodic Table; and any combination of an element from Group III, such as B, Al, Ga, In, and Tl, with any element from Group V, such as N, P, As, Sb and Bi, of the Periodic Table.

The nanocrystals, including luminescent nanocrystals, described herein may also further comprise ligands conjugated, cooperated, associated or attached to their surface. Suitable ligands may include any group known to those skilled in the art, including those disclosed in U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosures of each of which are incorporated herein by reference. Use of such ligands may enhance the ability of the nanocrystals to incorporate into various solvents and matrixes, including polymers. Increasing the miscibility (i.e., the ability to be mixed without separation) of the nanocrystals in various solvents and matrixes may allow them to be distributed throughout a polymeric composition such that the nanocrystals do not aggregate together and therefore do not scatter light. Such ligands are described as "miscibility-enhancing" ligands herein.

In certain embodiments, compositions comprising nanocrystals distributed or embedded in a matrix material are provided. Suitable matrix materials may be any material known to the ordinarily skilled artisan, including polymetic materials, organic and inorganic oxides. Compositions described herein may be layers, encapsulants, coatings, sheets or films. It should be understood that in embodiments described herein where reference is made to a layer, polymeric layer, matrix, sheet or film, these terms are used interchangeably, and the embodiment so described is not limited to any one type of composition, but encompasses any matrix material or layer described herein or known in the art.

Down-converting nanocrystals (for example, as disclosed in U.S. Pat. No. 7,374,807) utilize the emission properties of luminescent nanocrystals that are tailored to absorb light of a particular wavelength and then emit at a second wavelength, thereby providing enhanced performance and efficiency of active sources (e.g., LEDs).

While any method known to the ordinarily skilled artisan may be used to create nanocrystals (luminescent nanocrystals), a solution-phase colloidal method for controlled growth of inorganic nanomaterial phosphors may be used. See Alivisatos, A. P., "Semiconductor clusters, nanocrystals, and quantum dots," Science 271:933 (1996); X. Peng. M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J Am. Chem. Soc. 115:8706 (1993), the disclosures of which are incorporated by reference herein in their entireties. This manufacturing process technology leverages low cost processability without the need for clean rooms and expensive manufacturing equipment. In these methods, metal precursors that may undergo pyrolysis at high temperature are rapidly injected into a hot solution of organic surfactant molecules. These precursors may break apart at elevated temperatures and react to nucleate nanocrystals. After this initial nucleation phase, a growth phase may begin by the addition of monomers to the growing crystal. The result may be freestanding crystalline nanoparticles in solution that may have an organic surfactant molecule coating their surface.

Utilizing this approach, synthesis may occur as an initial nucleation event that takes place over seconds, followed by crystal growth at elevated temperature for several minutes. Parameters such as the temperature, types of surfactants present, precursor materials, and ratios of surfactants to monomers may be modified so as to change the nature and progress of the reaction. The temperature controls the structural phase of the nucleation event, rate of decomposition of precursors, and rate of growth. The organic surfactant molecules may mediate both solubility and control of the nanocrystal shape. The ratio of surfactants to monomer, surfactants to each other, monomers to each other, and the individual concentrations of monomers may strongly influence the kinetics of growth.

According to an embodiment, CdSe may be used as the nanocrystal material, in one example, for visible light down-conversion, due to the relative maturity of the synthesis of this material. Due to the use of a generic surface chemistry, it may also possible to substitute non-cadmium-containing nanocrystals.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., J Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states may be to epitaxially grow an inorganic shell material on the surface of the nanocrystal. X. Peng, et al., J. Am. Chem. Soc. 30:701 9-7029 (1997). The shell material may be chosen such that the electronic levels are type 1 with respect to the core material (e.g., with a larger bandgap to provide a potential step localizing the electron and hole to the core). As a result, the probability of non-radiative recombination may be reduced.

Core-shell structures may be obtained by adding organometallic precursors containing the shell materials to a reaction mixture containing the core nanocrystal. In this case, rather than a nucleation event followed by growth, the cores act as the nuclei, and the shells may grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and to ensure solubility. A uniform and epitaxially grown shell may be obtained when there is a low lattice mismatch between the two materials.

Example materials for preparing core-shell luminescent nanocrystals may include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuP, CuCl, CuBr, CuI, $Si_3N_4$, $Ge_3N_4$, $Al_2O_3$, $(Al, Ga, In)_2 (S, Se, Te)_3$, AlCO, and shell luminescent nanocrystals for use in the practice of the present invention include, but are not limited to, (represented as Core/Shell), CdSe/ZnS, InP/ZnS, InP/ZnSe, PbSe/PbS, CdSe/CdS, CdTe/CdS, CdTe/ZnS, as well as others.

As used throughout, a plurality of phosphors or a plurality of luminescent nanocrystals means more than one phosphor or luminescent nanocrystal (i.e., 2, 3, 4, 5, 10, 100, 1,000, 1,000,000, etc., nanocrystals). The compositions will suitably comprise phosphors or luminescent nanocrystals having the same composition, though in further embodiments, the plurality of phosphors or luminescent nanocrystals may be various different compositions. For example, the luminescent nanocrystals may all emit at the same wavelength, or in further embodiments, the compositions may comprise luminescent nanocrystals that emit at different wavelengths.

Luminescent nanocrystals for use in the embodiments described herein may be less than about 100 nm in size, and down to less than about 2 nm in size and absorb visible light. As used herein, visible light is electromagnetic radiation with wavelengths between about 380 and about 780 nanometers that is visible to the human eye. Visible light can be separated into the various colors of the spectrum, such as red, orange, yellow, green, blue, indigo and violet. Blue light may comprise light between about 435 nm and about 500 nm, green light may comprise light between about 520 nm and 565 nm and red light may comprise light between about 625 nm and about 740 nm in wavelength.

According to various embodiments, the luminescent nanocrystals may have a size and a composition such that they absorb photons that are in the ultraviolet, near-infrared, and/or infrared spectra. The ultraviolet spectrum may comprise light between about 100 nm to about 400 nm, the near-infrared spectrum may comprise light between about 750 nm to about 100 µm in wavelength, and the infrared spectrum may comprise light between about 750 nm to about 300 µm in wavelength.

While luminescent nanocrystals of any suitable material may be used in the various embodiments described herein, in certain embodiments, the nanocrystals may be. ZnS, InAs, CdSe, or any combination thereof to form a population of nanocrystals for use in the embodiments described herein. As discussed above, in further embodiments, the luminescent nanocrystals may be core/shell nanocrystals, such as CdSe/ZnS, InP/ZnSe, CdSe/CdS or InP/ZnS.

According to various embodiments, the luminescent nanocrystals may include at least one population of luminescent nanocrystals capable of emitting red light and/or at least one population of luminescent nanocrystals capable of emitting green light upon excitation by a blue/UV light source. The luminescent nanocrystal wavelengths and concentrations may be adjusted to meet the optical performance required. In other embodiments, the luminescent nanocrystals phosphor material may comprise a population of luminescent nanocrystals which absorb wavelengths of light having undesirable emission wavelengths, and reemit secondary light having a desirable emission wavelength. In this manner, the luminescent nanocrystal films described herein may comprise at least one population of color-filtering luminescent nanocrystals to further tune the BLU emission and to reduce or eliminate the need for color filtering.

Suitable luminescent nanocrystals, methods of preparing luminescent nanocrystals, including the addition of various solubility-enhancing ligands, can be found in Published U.S. Patent Publication No. 2012/0113672, the disclosure of which is incorporated by reference herein in its entirety.

Example Embodiments of Compositions of Phosphors

As used herein, the term "phosphors" refers to a synthetic fluorescent or phosphorescent substance. Example phosphors include traditional materials such as cerium(II)-doped YAG phosphors (YAG:$Ce^{3+}$, or $Y_3Al_5O_{12}$:$Ce^{3+}$), as well as luminescent nanocrystals, as described herein. Additional phosphors that may be utilized in display devices, such as display device 100, described herein include, but are not limited to, silicate phosphors, garnet phosphors, aluminate phosphors, nitride phosphors, NYAG phosphors, SiAlON phosphors and $CaAlSiN_3$-based (CASN) phosphors, as well as other phosphors known in the art.

As described throughout, compositions comprising phosphors for use in, for example, phosphor films 114, 214, 314, and/or 414 (as described herein with reference to FIGS. 1-4), may have numerous shapes, including for example, films or sheets. In further embodiments, the compositions may be various containers or receptacles for receiving the phosphors, suitably luminescent nanocrystals.

Suitably, phosphors, and specifically luminescent nanocrystals, may be dispersed or embedded in suitable polymeric materials and sandwiched between one or more barrier layers on either side of the matrix to create films or sheets, such as phosphor films 114, 214, 314, and/or 414, also called quantum dot enhancement films (QDEFs). Such films are described, for example, in U.S. Patent Publication Nos. 2010/0110728 and 2012/0113672, the disclosures of each of which are incorporated by reference herein in their entireties.

The luminescent nanocrystals of phosphor films 114, 214, 314, and/or 414 may be coated with one or more ligand coatings, embedded in one or more films or sheets, and/or sealed by one or more barrier layers. Such ligands, films, and barriers may provide photostability to the luminescent nanocrystals and protect the luminescent nanocrystals from environmental conditions including elevated temperatures, high intensity light, external gases, moisture, and other harmful environmental conditions. Additional effects may be achieved with these materials, including a desired index of refraction in the host film material, a desired viscosity or luminescent nanocrystal dispersion/miscibility in the host film material, and other desired effects. In embodiments, the ligand and film materials will be chosen to have a sufficiently low thermal expansion coefficient, such that thermal curing does not substantially affect the luminescent nanocrystal phosphor material.

The luminescent nanocrystals of phosphor films 114, 214, 314, and/or 414 may comprise ligands conjugated to, cooperated with, associated with, or attached to their surface. In an embodiment, the luminescent nanocrystals may include a coating layer comprising ligands to protect the luminescent nanocrystals from external moisture and oxidation, control aggregation, and allow for dispersion of the luminescent nanocrystals in the matrix material. Ligands and matrix materials, as well as methods for providing such materials, are described herein. Additional ligands and film materials, as well as methods for providing such materials, include any group known to those skilled in the art, including those disclosed in U.S. Patent Publication No. 2012/0113672; U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosure of each of which is incorporated herein by reference in its entirety. Additionally, ligand and matrix materials may include any suitable materials in the art.

Dispersing luminescent nanocrystals in a polymeric material provides a method to seal the nanocrystals and provide a mechanism for mixing various compositions and sizes of luminescent nanocrystals. As used throughout, "dispersed" includes uniform (i.e., substantially homogeneous) as well as non-uniform (i.e., substantially heterogeneous) distribution or placement of luminescent nanocrystals.

Materials for use in the compositions (e.g., phosphor films 114, 214, 314, and/or 414) comprising the luminescent nanocrystals may include polymers and organic and inorganic oxides. Polymers may include any polymer known to the ordinarily skilled artisan that may be used for such a purpose. In an embodiment, the polymer may be substantially translucent or substantially transparent. Matrix materials may include, but are not limited to, epoxies; acrylates; norborene; polyethylene; polyvinyl butyral):poly(vinyl acetate); polyurea; polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and polyacrylonitrile ethylene styrene) (AES); polymers that are crosslinked with difunctional monomers, such as divinylbenzene; cross-linkers suitable for cross-linking ligand materials; epoxides which combine with ligand amines (e.g., APS or PEI ligand amines) to form epoxy, and the like.

The luminescent nanocrystals as described herein may be embedded in a polymeric (or other suitable material, e.g., waxes, oils) matrix using any suitable method, for example, mixing the luminescent nanocrystals in a polymer and casting a film; mixing the luminescent nanocrystals with monomers and polymerizing them together; mixing the luminescent nanocrystals in a sol-gel, or any other method known to those skilled in the art. As used herein, the term "embedded" is used to indicate that the luminescent nanocrystals are enclosed or encased within the polymer. It should be noted that luminescent nanocrystals may be uniformly distributed throughout the composition, though in further embodiments they may be distributed according to an application-specific uniformity distribution function.

The thickness of the compositions (e.g., phosphor films 114, 214, 314, and/or 414) comprising luminescent nanocrystals as described herein may be controlled by any method known in the art, such as spin coating and screen printing. The luminescent nanocrystal compositions (e.g., phosphor films 114, 214, 314, and/or 414) as described herein may be any desirable size, shape, configuration and thickness. For example, the compositions (e.g., phosphor films 114, 214, 314, and/or 414) may be in the form of layers, as well as other shapes, for example, discs, spheres, cubes or blocks, tubular configurations and the like. The compositions (e.g., phosphor films 114, 214, 314, and/or 414) are on the order of about 100 μm in thickness i.e., in one dimension. In other embodiments, the polymeric films may be on the order of 10's to 100's of microns in thickness. The luminescent nanocrystals may be embedded in the various compositions at any loading ratio that is appropriate for the desired function. For example, the luminescent nanocrystals may be loaded at a ratio of between about 0.001% and about 75% by volume depending upon the application, polymer and type of nanocrystals used. The appropriate loading ratios can readily be determined by the ordinarily skilled artisan and are described herein further with regard to specific applications. In an embodiment, the amount of nanocrystals loaded in a luminescent nanocrystal composition (e.g., in phosphor films 114, 214, 314, and/or 414) may be on the order of about 10% by volume, to parts-per-million (ppm) levels.

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

What is claimed is:

1. A method of forming a display device, the method comprising:
   providing at least one optical cavity having a top side, a bottom side, and side walls;
   coupling an array of light sources to the at least one optical cavity; and
   supporting an array of quantum dot (QD) films within the at least one optical cavity.

2. The method of claim 1, further comprising providing an optically diffusive layer as the top side of the at least one optical cavity.

3. The method of claim 1, wherein the supporting of the array of QD films comprises coupling the array of QD films to the top side of the at least one optical cavity.

4. The method of claim 1, wherein the supporting of the array of QD films comprises:
   providing a first plate positioned within the at least one optical cavity; and
   coupling the array of QD films to the first plate.

5. The method of claim 1, wherein the supporting of the array of QD films comprises:
   providing a first plate and a second plate positioned within the at least one optical cavity; and
   interposing the array of QD films between the first and second plates.

6. The method of claim 5, further comprising providing an optically diffusive layer as the second plate.

7. The method of claim 1, further comprising coupling the array of light sources to a top surface of the bottom side of the at least one optical cavity.

8. The method of claim 1, further comprising:
   forming an enclosed volume surrounding a row of the array of light sources using a QD film of the array of QD films.

9. The method of claim 8, wherein the forming of the enclosed volume comprises:
   bending the QD film over the row of the array of light sources; and
   coupling the QD film to a top surface of the bottom side of the at least one optical cavity.

10. A method comprising:
    providing at least one optical cavity;
    disposing an array of light sources on a bottom side of the at least one optical cavity; and
    supporting an array of quantum dot (QD) films within the at least one optical cavity.

11. The method of claim 10, further comprising forming an enclosed volume surrounding each row of the array of light sources using a corresponding QD film of the array of QD films.

12. The method of claim 10, wherein the supporting of the array of QD films comprises coupling the array of QD films to a top side of the at least one optical cavity.

13. The method of claim 10, wherein the supporting of the array of QD films comprises:
    providing a first plate positioned within the at least one optical cavity; and
    coupling the array of QD films to the first plate.

14. A method of forming a light source unit, the method comprising:
    coupling an array of light sources to a bottom side of at least one optical cavity; and
    disposing an array of quantum dot (QD) films within the at least one optical cavity;
    bending a QD film of the array of QD film to form a bent QD film; and
    placing the bent QD film over a row of the array of light sources.

15. The method of claim 14, further comprising bending each QD film of the array of QD films to form an array of bent QD films within the at least one optical cavity.

16. The method of claim 14, further comprising forming an enclosed volume surrounding the row of the array of light sources using the bent QD film of the array of QD films.

17. The method of claim 14, further comprising bending each QD film of the array of QD films over a corresponding row of the array of light sources.

18. The method of claim 14, further comprising coupling the bent QD film to the bottom side of the at least one optical cavity.

19. The method of claim 14, further comprising coupling the bent QD film to the at least one optical cavity with an optically transparent adhesive or a mechanical fastener.

20. The method of claim 14, further comprising forming a semi-circular, triangular, or rectangular shaped volume surrounding the row of the array of light sources using the bent QD film.

* * * * *